US011261069B2

(12) United States Patent
Chow et al.

(10) Patent No.: US 11,261,069 B2
(45) Date of Patent: Mar. 1, 2022

(54) AUTOMATED GUIDED VEHICLE WITH LOAD STABILITY DETERMINATION

(71) Applicant: Logistics and Supply Chain MultiTech R&D Centre Limited, Pok Fu Lam (HK)

(72) Inventors: Wing Leung Chow, Pok Fu Lam (HK); King Sau Wong, Pok Fu Lam (HK); Lu Sze Wai, Pok Fu Lam (HK); Kwai Yuen Tiu, Pok Fu Lam (HK)

(73) Assignee: Logistics and Supply Chain Multitech R&D Centre Limited, Pok Fu Lam (HK)

( * ) Notice: Subject to any disclaimer, the term of this patent is extended or adjusted under 35 U.S.C. 154(b) by 293 days.

(21) Appl. No.: 16/293,993

(22) Filed: Mar. 6, 2019

(65) Prior Publication Data
US 2020/0283279 A1    Sep. 10, 2020

(51) Int. Cl.
| | | |
|---|---|---|
| *B66F 9/06* | (2006.01) | |
| *G01M 1/12* | (2006.01) | |
| *G01G 19/12* | (2006.01) | |
| *B66F 17/00* | (2006.01) | |

(52) U.S. Cl.
CPC ............ *B66F 17/003* (2013.01); *B66F 9/063* (2013.01); *G01G 19/12* (2013.01); *G01M 1/122* (2013.01)

(58) Field of Classification Search
CPC ........... G01G 19/12; B66F 9/063; B66F 9/06; G01M 1/122
See application file for complete search history.

(56) References Cited

U.S. PATENT DOCUMENTS

| | | | |
|---|---|---|---|
| 10,106,383 B2 * | 10/2018 | Shen ......................... | B66F 3/08 |
| 2008/0271541 A1 * | 11/2008 | Neuman ................ | G01G 19/12 |
| | | | 73/767 |
| 2018/0141752 A1 * | 5/2018 | Nakanishi ............... | B66F 9/063 |

FOREIGN PATENT DOCUMENTS

GB          2424961 A  * 10/2006   ............. G01G 19/12

* cited by examiner

*Primary Examiner* — Thomas G Black
*Assistant Examiner* — Tarek Elarabi
(74) *Attorney, Agent, or Firm* — Renner, Kenner, Greive, Bobak, Taylor & Weber (57) ABSTRACT

An automated guided vehicle includes a chassis and a load supporting apparatus positioned on the chassis, the load supporting apparatus including a platform to support a load, one or more weight sensors located in contact with the platform, the one or more weight sensors configured to provide a signal indicative of a weight of the load on the platform, and an electronic processor arranged in electronic communication with the one or more weight sensors. The electronic processor is configured to receive the signal from each of the one or more weight sensors, and the electronic processor is configured to process the signal and determine stability of the load on the platform.

28 Claims, 9 Drawing Sheets

AUTOMATED GUIDED VEHICLE WITH LOAD STABILITY DETERMINATION

TECHNICAL FIELD

The present disclosure relates to an automated guided vehicle (AGV) with load stability determination of a load supported by the AGV.

BACKGROUND

Warehousing is becoming increasingly popular especially with the increasing popularity of online shopping and delivery of goods. Warehouses are an example of an indoor environment where automated guided vehicles are commonly used. An automated guided vehicle (AGV) is a mobile robot or mobile vehicle that is used in a warehouse for various functions such as moving shelving racks or moving goods between shelves or stacking goods etc. AGVs are also used to transport other objects such as boxes or goods around an environment e.g. around a warehouse. AGVs include suspension systems that attempt to adapt to uneven surfaces. AGVs are often used to lift loads e.g. shelves or boxes or pellets etc. Stability of loads during lifting and transport is important to prevent damage to the loads.

SUMMARY OF THE INVENTION

The present disclosure relates to an automated guided vehicle (AGV) including a load supporting apparatus that provides a stable structure to retain and support a load e.g. an object or box or a shelf or other items. The AGV is further configured for determining stability of the load being supported by the AGV.

In accordance with a first aspect the present invention relates to an automated guided vehicle comprising:
a chassis;
a load supporting apparatus positioned on the chassis, the load supporting apparatus comprising;
a platform to support a load,
one or more weight sensors located in contact with the platform, the one or more weight sensors configured to provide a signal indicative of a weight of the load on the platform,
an electronic processor arranged in electronic communication with the one or more weight sensors, the electronic processor configured to receive the signal from each of the one or more weight sensors and the electronic processor configured to process the signal and determine stability of the load on the platform.

In an embodiment stability is determined based on the centre of gravity of the load on the platform.

In an embodiment the electronic processor is configured to process the received signal or signals indicative of weight and determine a centre of gravity of the load.

In an embodiment the electronic processor is configured to compare the location of the determined centre of gravity with a predefined stability boundary in order to determine stability of the load.

In an embodiment the predefined stability boundary represents a limit for the location of the load.

In an embodiment the electronic processor is configured to determine the stability of the load based on the location of the centre of gravity of the load relative to the predefined stability boundary, the load is determined as being stable if the centre of gravity is within the stability boundary and the load is determined as being unstable.

In an embodiment the predefined stability boundary is stored within the electronic processor.

In an embodiment the load supporting apparatus comprises a plurality of weight sensors, the plurality of weight sensors are positioned to contact the platform such that the platform bears weight on to the weight sensors and wherein the weight sensors are spaced apart from each other.

In an embodiment the weight sensors are evenly spaced apart from each other along the platform and wherein each weight sensor is a load sensor.

In an embodiment the load supporting apparatus comprises four weight sensors.

In an embodiment the electronic processor is configured to determine the location of each weight sensor relative to a datum, the electronic processor is configured to determine the centre of gravity of the load based on the weight sensed at each weight sensor and the location of each weight sensed at each weight sensor.

In an embodiment the electronic processor is configured to determine the centre of gravity by calculating a moment for each weight sensed at each weight sensor, summing the moments and dividing the sum of the moments by the sum of the weights determined at each weight sensor, wherein the centre of gravity being determined as a location relative to the datum.

In an embodiment the electronic processor is configured to determine moment by multiplying a weight sensed at a weight sensor by the distance of the weight sensor from the datum.

In an embodiment the locations of the weight sensors, the datum and the determined centre of gravity are defined on a predefined coordinate system stored within the electronic processor, such that the locations of the weight sensors, the datum and the boundary are defined as coordinates on the predefined coordinate system.

In an embodiment the location of each weight sensor and the centre of gravity are defined as Cartesian coordinates or polar coordinates relative to the datum, wherein the datum.

In an embodiment the electronic processor is configured repeatedly calculate centre of gravity of the load on the platform and the stability of load relative to the stability boundary as the automated guided vehicle moves in order to determine if the load becomes unstable as the automated guided vehicle moves.

In an embodiment the electronic processor is configured to adjust the shape and/or size of the stability boundary based on the motion of the automated guided vehicle.

In an embodiment the electronic processor is configured detect movement of the AGV based on a signal from a drive motor or based on a signal received from a motion sensor positioned on the chassis.

In an embodiment comprises a lifting mechanism comprising one or more jacks, the one or more jacks supporting the platform and configured to raise and lower the platform, and wherein each sensor of the one or more sensors is disposed on a single jack of the lifting mechanism.

In accordance with a second aspect the present invention relates to an automated guided vehicle comprising:
a chassis,
two or more movement structures connected to the chassis and rotatable relative to the chassis a drive assembly disposed on the chassis, the drive assembly comprising a drive motor and a drive shaft, the drive shaft coupled to the drive motor and the two or more movement structures to connect the drive motor to the two or more movement structures, the drive motor configured to provide a drive force that is transmitted to the two or more movement structures via the drive shaft, the drive force causing the automated guided vehicle to move, a load supporting apparatus positioned on the chassis, the load supporting apparatus comprising:

a platform to support a load, a lifting mechanism comprising a plurality of jacks that can vertically translate, the plurality of jacks arranged in contact with the platform to support the platform and vertically translate the platform, a plurality of weight sensors located in contact with the platform, the plurality of weight sensors configured to provide a signal indicative of a weight of the load on the platform, an electronic processor arranged in electronic communication with the plurality of weight sensors, the electronic processor configured to receive the signal from each of the weight sensors, the electronic processor configured to process the received signals to determine a centre of gravity of the load on the platform and determine if the centre of gravity is situated within a predefined stability boundary.

In an embodiment the electronic processor is configured measure the weight of the load at the plurality of weight sensors, determine the distance of each weight sensor relative to a predetermined datum and determine the centre of gravity of the load based on the distance of the weight sensor relative to the datum and the weight measured at each weight sensor.

In an embodiment the electronic processor comprises a reference coordinate system, the datum and location of each weight sensor is defined within the reference coordinate system.

In an embodiment the determined centre of gravity is defined as a coordinate in the reference coordinate system.

In an embodiment the reference coordinate system is a two dimensional coordinate system defining a first dimension and a second dimension, wherein the datum is the origin of the reference coordinate system and wherein the centre of gravity and location of each weight sensor are defined either as Cartesian coordinates or polar coordinates.

In an embodiment the electronic processor is configured to:

multiply the weight sensed by each weight sensor by a distance of the weight sensor relative to the datum in a first dimension to calculate a moment in a first dimension, sum the moments in the first dimension, sum the weight values, divide the sum of moments in the first dimension by the sum of the weight values to calculate a coordinate of the centre of gravity in the first dimension multiply the weight sensed by each weight sensor by a distance of the weight sensor relative to the datum in a second dimension to calculate a moment in a second dimension, sum the moments in the second dimension, sum the weight values, divide the sum of moments in the second dimension by the sum of the weight values to calculate a coordinate of the centre of gravity in the second dimension, wherein the position of the centre of gravity is defined as a coordinate within the reference coordinate system.

In an embodiment the electronic processor is configured to compare the position of the centre of gravity relative to a predefined stability boundary, wherein if the position of the centre of gravity is within the stability boundary the processor determines the load as being stable and if the position of the centre of gravity is determined as being outside the stability boundary the processor determines the load as being unstable.

In an embodiment the electronic processor is configured to generate an alarm signal and provide the alarm signal to another device if the load is determined to be unstable.

In an embodiment the electronic processor is configured to determine the centre of gravity of a load once the load is detected on the platform via the weight sensors, the electronic processor is further configured detect movement of the automated guided vehicle, and the electronic processor is configured to re-determine the centre of gravity of the load as the automated guided vehicle moves.

In an embodiment the electronic processor is configured to recalculate the stability boundary based on the speed of the automated guided vehicle, wherein the electronic processor is configured to determine speed based on a characteristic of the drive motor.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

The term AGV as used herein means an automated guided vehicle that can automatically move around an environment.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, circuits, etc., may be shown in block diagrams in order not to obscure the embodiments in unnecessary detail. In other instances, well-known modules, structures and techniques may not be shown in detail in order not to obscure the embodiments.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, system, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which.

DETAILED DESCRIPTION OF THE PREFERRED EMBODIMENTS

Automated guided vehicles (AGVs) are becoming more commonplace across several industries for various applications. Automated guided vehicles (AGVs) are often used for materials handling tasks within factories or warehouses or other environments. Some example uses of AGVs are for moving shelving racks or moving goods or moving boxes/containers around a warehouse or factory. AGVs generally include a load supporting apparatus such as a platform or a lifting arm or tines such as a forklift. Loads (e.g. boxes, shelving racks etc.) are supported by the load supporting apparatus. The load supporting apparatus generally comprises a lifting mechanism or lifting assembly that is configured to lift the load supporting apparatus in order to lift the loads.

Often multiple AGVs are used in an indoor environment e.g. in a warehouse. Due to space constraints in an indoor environment there is always a risk of collisions between AGVs in an indoor environment and/or collisions between the AGVs and other objects within an indoor environment. AGVs can utilise any known guidance protocol (i.e. guidance methodology). For example, the environment may include waypoints or markers positioned along the floor of the environment or the AGV may include a stored map that is used by the AGV to navigate itself around an environment (e.g. a warehouse or factory).

Most autonomous guided vehicles (AGVs) available today are usually equipped with a suspension system to adapt to uneven surfaces as the AGV moves around an environment. One example use for AGVs is materials handling e.g. lifting and transporting various objects such as for example shelves or pallets or boxes or other items. The objects are normally supported on a support structure. The weight of an object i.e. load being lifted is measured or estimated prior to lifting the load. However, the weight distribution of the load is unknown. The lifting mechanism can fail if overloaded. Further the object may tip over if the weight distribution is out of balance i.e. if the load is unstable the load can fall off the lifting mechanism.

The present disclosure relates to an AGV with a load supporting apparatus to support an object in a stable manner. The load supporting apparatus is configured to determine stability of a supported load as the AGV moves. The present disclosure relates to an automated guided vehicle (AGV) with load stability determination of a load supported by the AGV. The AGV is further configured for determining stability (i.e. weight distribution) of the load being supported by the AGV before lifting a load and/or during transporting a load. The AGV is configured to determine stability by determining a centre of gravity of the load (i.e. object)

In one configuration the AGV comprises a chassis, a load supporting apparatus positioned on the chassis, the load supporting apparatus comprising, a platform to support a load, one or more weight sensors located in contact with the platform, the one or more weight sensors configured to provide a signal indicative of a weight of the load on the platform, an electronic processor arranged in electronic communication with the one or more weight sensors, the electronic processor configured to receive the signal from each of the one or more weight sensors and the electronic processor configured to process the signal and determine stability of the load on the platform.

Figure 1:
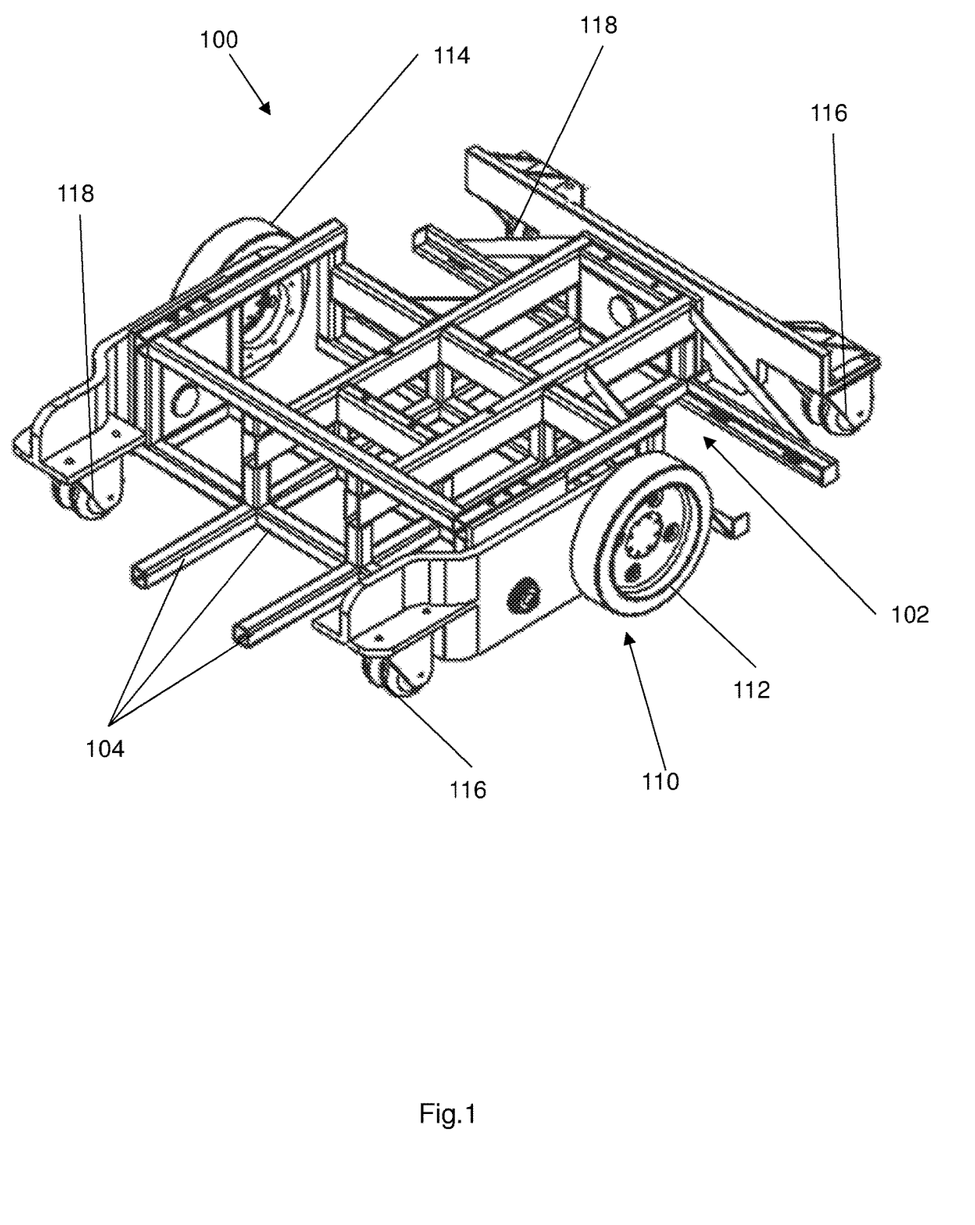
FIG. 1 shows an isometric view of an example embodiment of an automated guided vehicle (AGV) that includes a load supporting apparatus.

FIG. 1 shows an example an automated guided vehicle (AGV) 100. The AGV 100 comprises a chassis 102. The chassis 102 comprises a polygon shape such as for example a rectangle shape or a square shape. The chassis comprises a plurality of elongate members 104 that are interconnected to form the chassis 102. The elongate members are interconnected to define a skeleton that makes up the chassis 102. The chassis 102 includes a plurality of gaps to reduce the mass of the chassis 102.

The elongate members 104 are rigid members formed from a rigid material. In one example the members 104 are formed from a metal e.g. aluminium or stainless steel. The frame members 104 are rigid and robust such that the chassis can support other components of the AGV 100. The elongate frame members 104 are coupled together by fasteners such as for example bolts or screws or pins or rivets or any other suitable fasteners.

The AGV 100 comprises a drive assembly 110 disposed on the chassis 102. The drive assembly 110 is configured to generate a propulsion force to drive the AGV. In one configuration the drive assembly 110 comprises a drive motor configured to generate a propulsion force to propel the AGV and the drive assembly further comprises a turning motor configured generate a turning force to turn the AGV. The AGV 100 comprises two drive wheels 112, 114 and two turning wheels 116, 118. The turning wheels 116, 118 are freely rotatable. The turning wheels 116, 118 are mounted on the chassis via a caster or bearings that allow free rotation of the turning wheels. The drive wheels 112, 114 are mounted on the chassis 102 and coupled to the drive assembly 110. The drive wheels 112, 114 are coupled to the drive motor 122 and the turning motor 124. In this configuration the drive wheels 112, 114 are propelled in a single direction by the drive motor. The AGV 100 is turned by the turning motor 124 actuating the drive wheels 112, 114. One drive wheel 112 is actuated in one direction and the second drive wheel is actuated in the opposite direction to turn the AGV 100. The turning radius of the AGV 100 is small due to the opposing direction movement of the drive wheels 112, 114.

Figure 2:
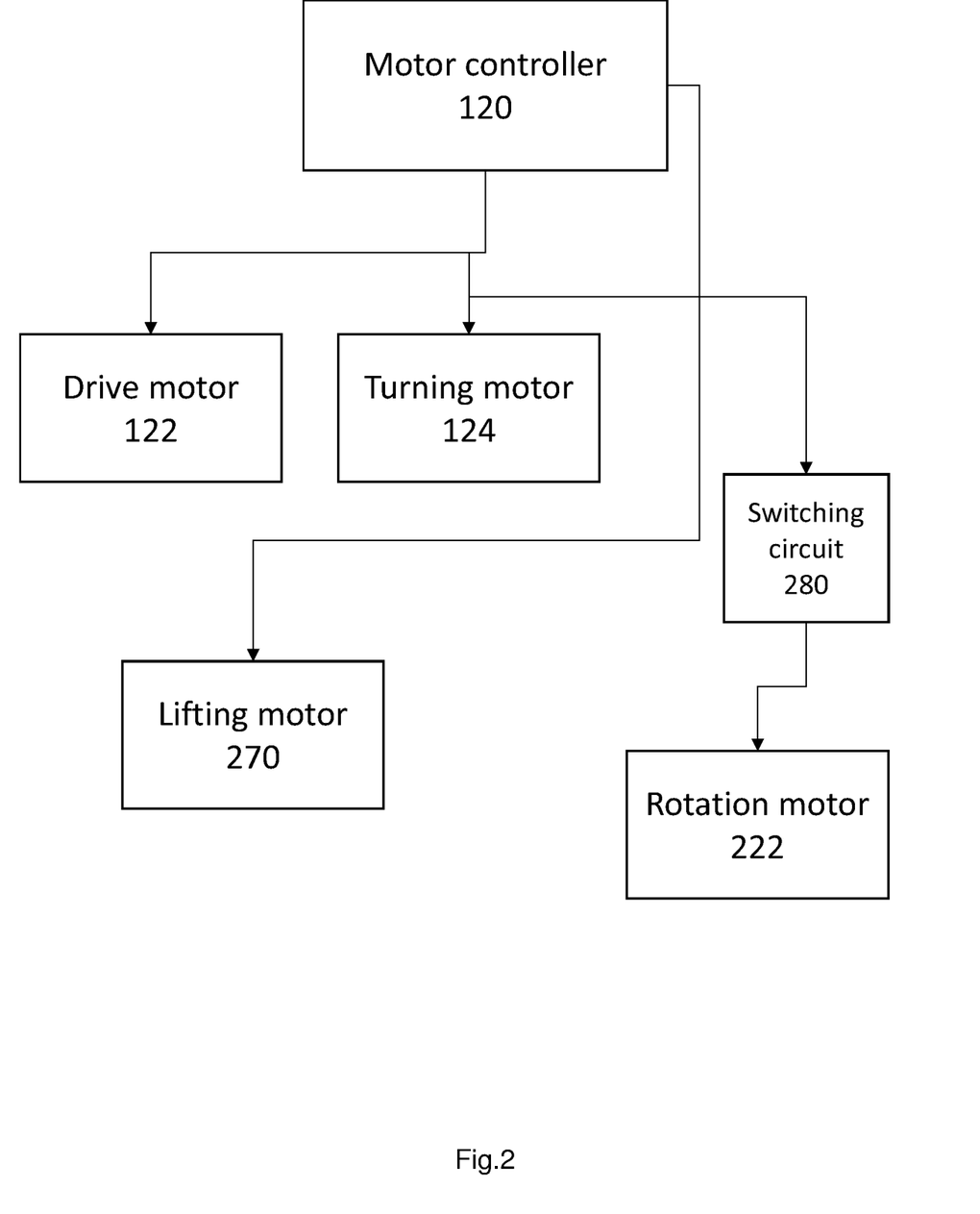
FIG. 2 shows a schematic arrangement the electronic connection arrangement between the drive motor, turning motor, lifting motor and a motor controller.

The AGV 100 comprises a motor controller 120. The motor controller 120 is arranged in electronic communication with the drive motor 122 and the turning motor 124. The motor controller 120 is configured to send electronic signals to control operation of the drive motor 122 and the turning motor 124. FIG. 2 shows a schematic diagram illustrating the electronic connection arrangement between the drive motor 122, turning motor 124 and the motor controller 120. The electrical connections between the motor controller 120 and the drive motor 122 and turning motor 124 may be wired or wireless connections.

In an alternative configuration the AGV 100 may comprise a single motor that functions as a drive motor and a rotation motor. In this alternative configuration the AGV may include a drive shaft and a steering shaft that is coupled to the motor. The motor exerts a force that is transmitted to the drive wheels by the drive shaft and a turning force is transmitted to the drive wheels by the steering shaft to turn the AGV.

Figure 3:
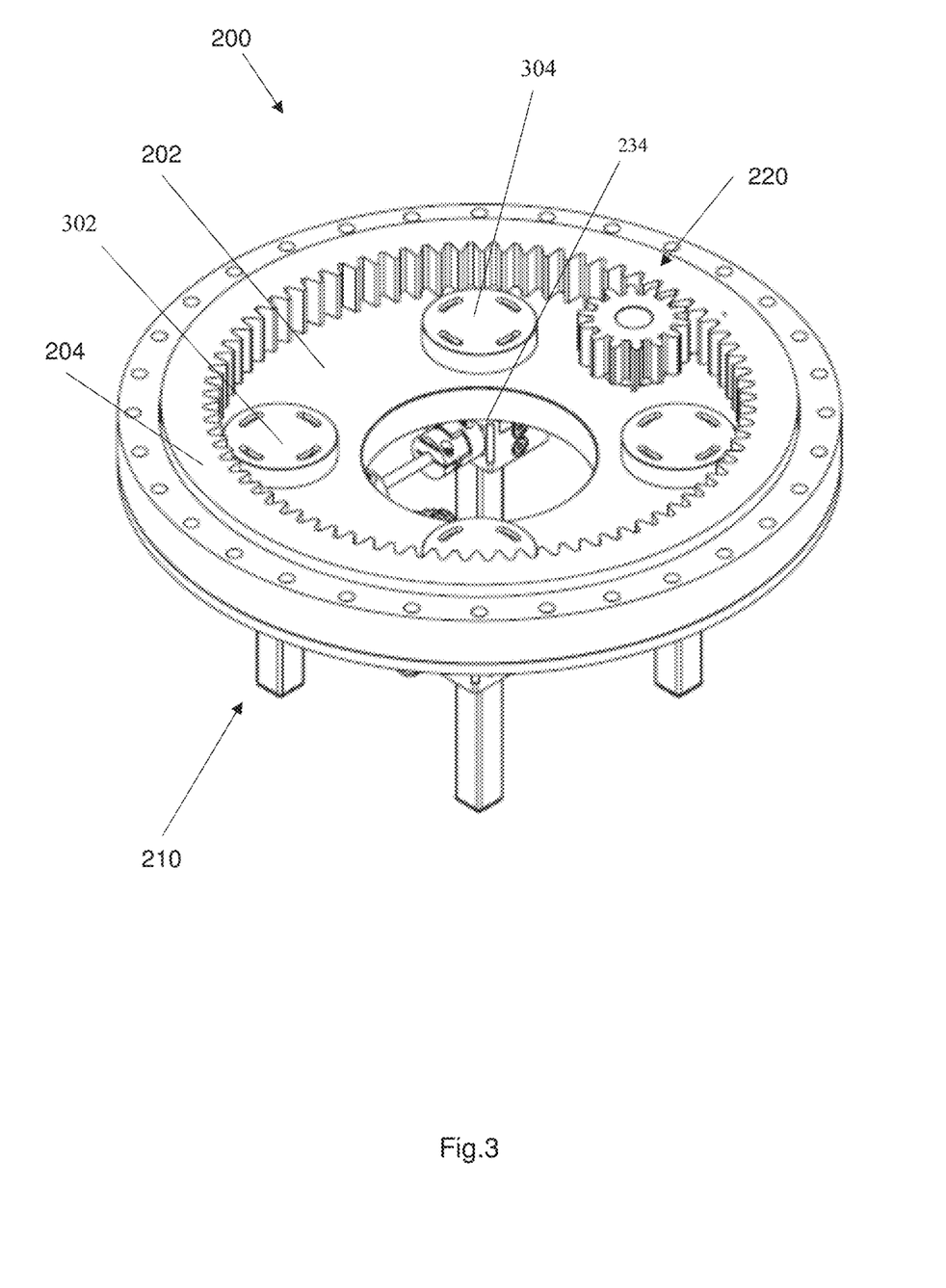
FIG. 3 shows an isometric view of the load supporting apparatus.

The AGV comprises a load supporting apparatus 200. FIG. 3 shows an example configuration of a load supporting apparatus 200. The load supporting apparatus 200 is removably coupled to the chassis 102. The load supporting apparatus 200 is configured to hold and support a load (e.g. an object or pallet or shelf or box or other objects). The load supporting apparatus 200 comprises a platform 202 to support a load, a lifting mechanism 210 and a rotation mechanism 220. The lifting mechanism is coupled to the platform and configured to raise or lower the platform. The rotation mechanism 220 is also coupled to the platform and configured to rotate the platform 202.

The platform 202 in the illustrated embodiment comprises an arcuate periphery. The platform 202 comprises a circular shape when viewed in plan. The platform 202 also comprises a raised wall 204 that extends around the platform and defines a periphery of the platform 202. The platform 202 may alternatively be an elliptical or oval shape.

Figure 4:
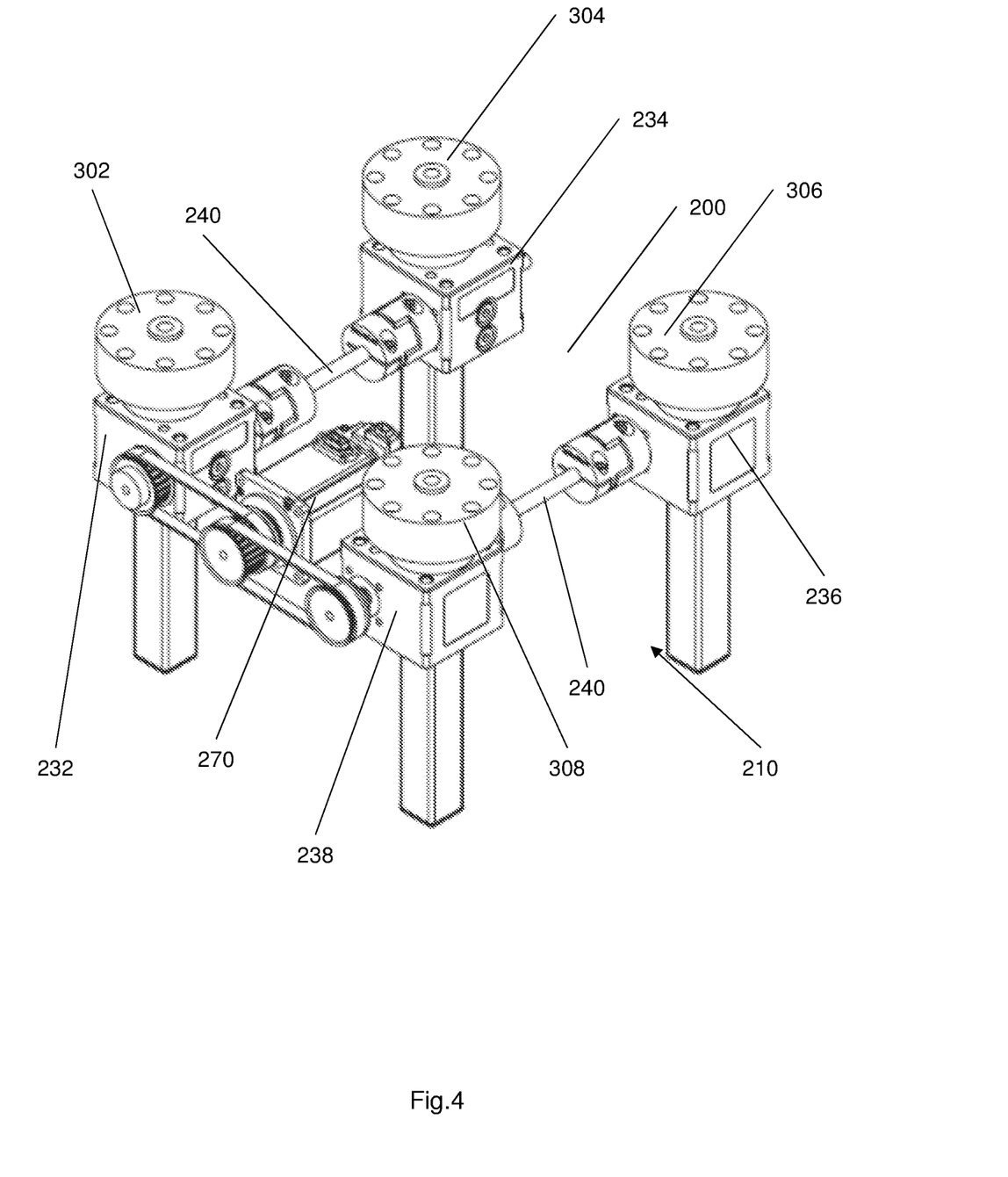
FIG. 4 shows an isometric view of the load supporting apparatus of FIG. 3 without the platform.
Figure 5:
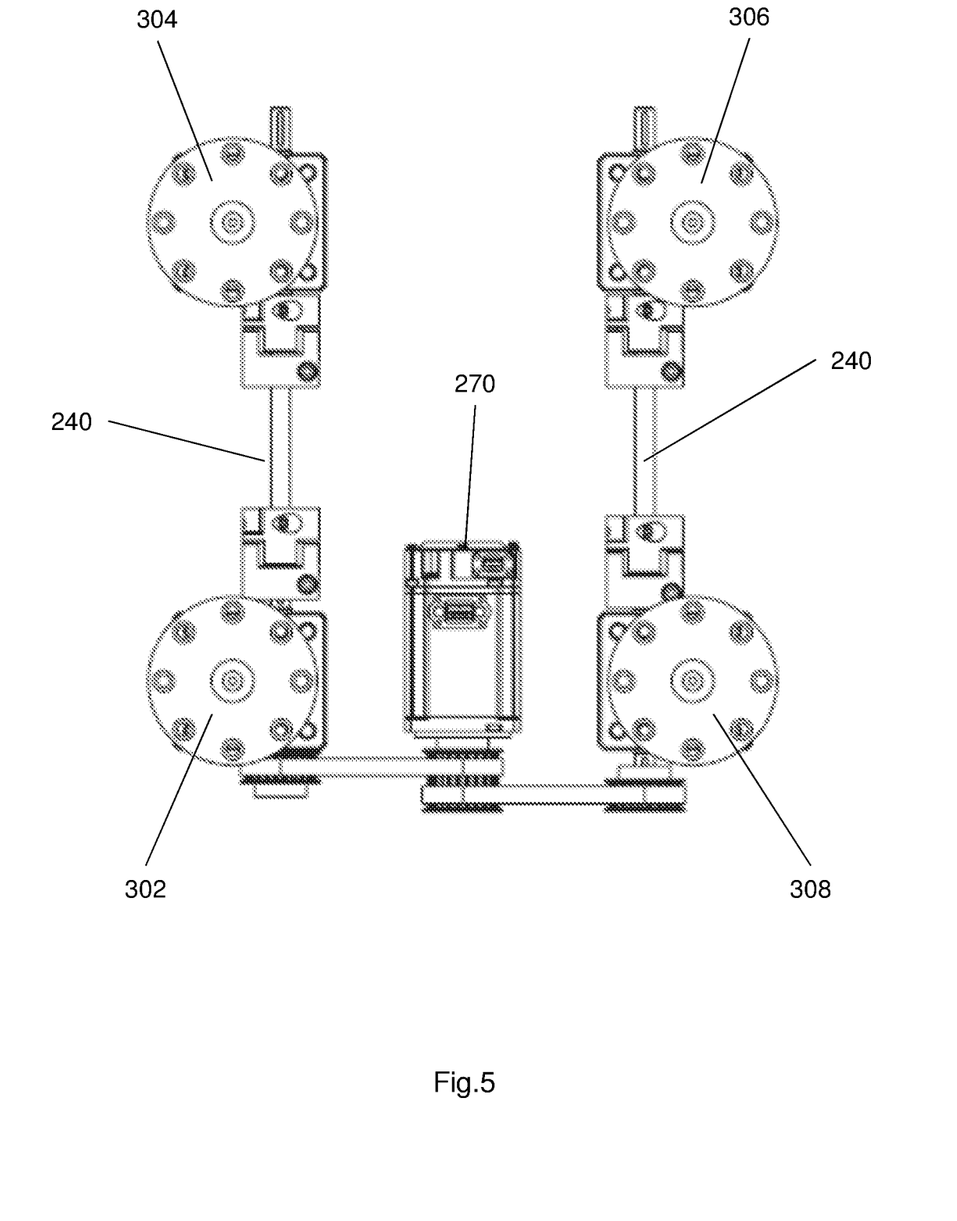
FIG. 5 shows a plan view i.e. a top view of the load supporting apparatus without the platform.
Figure 6:
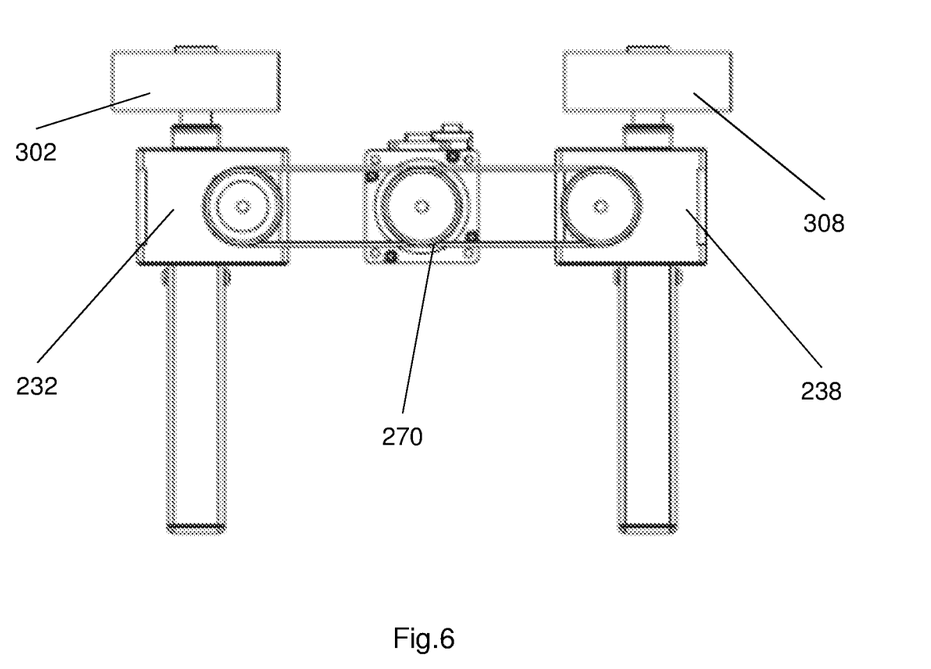
FIG. 6 shows a side of the load supporting apparatus without the platform.
Figure 7:
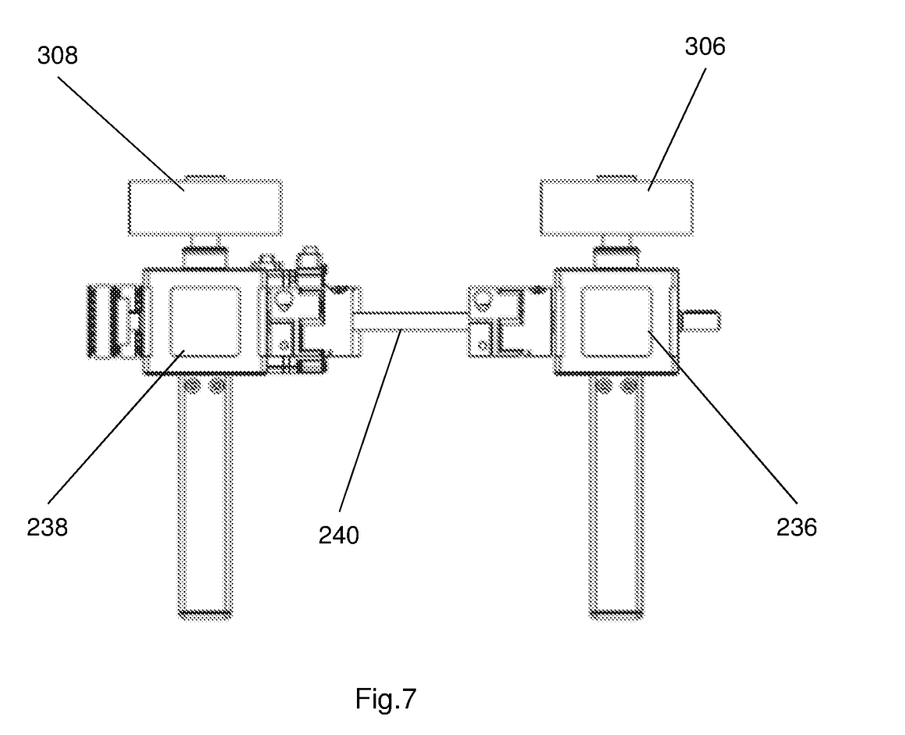
FIG. 7 shows an end view of the load supporting apparatus without the platform.

The lifting mechanism 210 comprises four lifting structures. In one example the lifting mechanism 210 comprises a plurality of jacks. The lifting mechanism comprises at least three jacks in order to evenly distribute the weight of the platform. In the illustrated example of FIG. 3 the lifting mechanism comprises four jacks 232, 234, 236, 238, as shown in FIG. 4. The jacks are configured to lift the platform 202 vertically to raise or lower a supported load. The jacks may be screw jacks that comprise a screw or gear mechanism to cause vertical translation. Alternatively, the jacks may be hydraulic or pneumatic jacks that are actuated by a hydraulic fluid or compressed air. The jacks each comprise a strut that is vertically translatable. The screw or gear mechanism actuates the strut to move the strut vertically. The struts contact the platform 202 and translate the platform 202 as the struts translate vertically. The jacks each are connected to legs that are joined to the chassis 102.

The lifting mechanism 210 further comprises a lifting motor 270 and one or more drive elements. The drive elements may be belt drives or chain drives. The drive elements couple the lifting motor to the jacks to actuate the jacks. Actuating the jacks causes the vertical translation of the platform. In one example configuration the four jacks are arranged in pairs of jacks. Each pair of jacks are coupled by a rigid coupler 240 e.g. a coupling rod. Actuating a single jack of each pair causes both jacks within the pair to be actuated since the actuation forces are transmitted by the rigid coupler. The lifting motor 270 actuates two jacks (one from each pair) via the drive elements. The translation of the jacks are synchronized.

The rotation mechanism 220 is coupled to the platform 202 to rotate the platform. The rotation of the platform 202 may be counter synchronized with the turning rotation of the AGV. The platform 202 is rotated in a counter direction to the rotation of the AGV in order to stabilise loads on the platform and prevent loads from sliding or moving on the platform. The rotation mechanism 220 comprises a rotation motor 222. The rotation motor 222 is electrically connected to a switching circuit 280 (as seen in FIG. 2). The switching circuit 280 is in electrical communication with the motor controller 120. FIG. 2 shows the switching circuit 280 arranged between the rotation motor 222 and the motor controller 120 and in electrical communication between the rotation motor 222 and the motor controller 120. The switching circuit 280 receives the same input as the turning motor and switches this input prior to providing it to the rotation motor 222. The switching circuit 280 is configured to switch the polarity of voltage or direction of current from the motor controller 120 such that the rotation motor 222 receives a voltage or current in a direction that is opposite to the voltage or current generated by the motor controller to rotate the platform 202 in a direction opposite to the turning direction of the AGV 100. The switching circuit 280 comprises an electrical circuit that can switch the polarity of the voltage signal. In one example the switching circuit may comprise a bridge circuit comprising a plurality of diodes that switches the voltage of the actuation signal provided to the turning motor. The switching circuit reversing polarity causes the rotation motor to turn in the opposite direction to the turning motor.

Alternatively, the switching circuit may cause the output to the rotation motor be opposite to the turning motor output such that the rotation motor is turned in the opposite direction to the turning motor.

FIGS. 4 to 7 show various views of the load supporting apparatus 200 without the platform 202. The load supporting apparatus 200 comprises at least one weight sensor. As seen in FIGS. 4 to 7 the load supporting apparatus 200 comprises a plurality of weight sensors. In the illustrated embodiment the load supporting apparatus 200 comprises four weight sensors 302, 304, 306 308. The weight sensors 302-308 are configured to sense a weight of loads positioned on the platform. The loads can be any loads e.g. objects or boxes or pallets or shelves etc. The weight sensors 302-308 are configured to generate a signal indicative of a weight of the load. In the illustrated embodiment the weight sensors are load sensors. The term weight can mean mass or mass× gravity.

Figure 8:
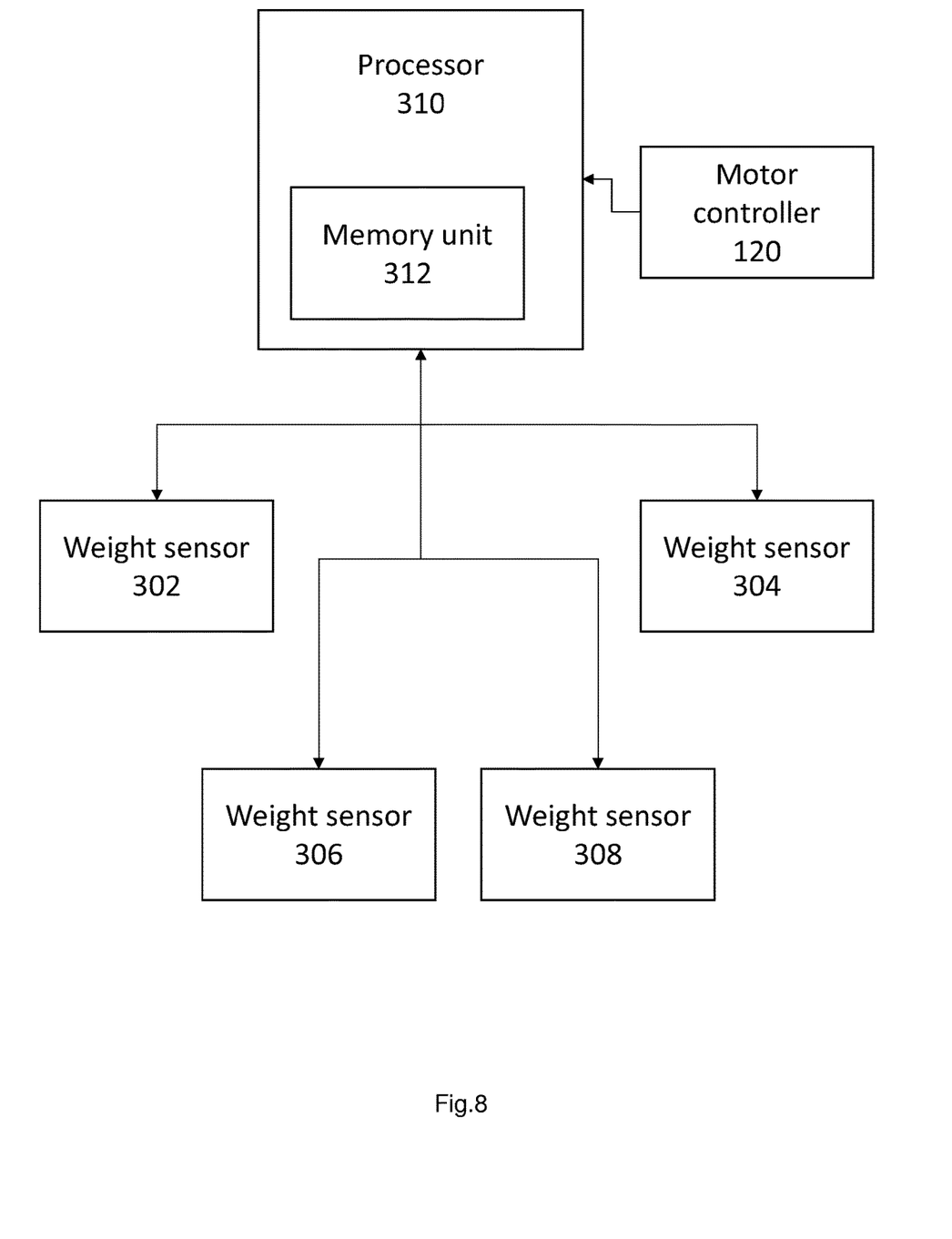
FIG. 8 shows a schematic diagram of the electronic processor and the weight sensors being electrically coupled to the processor.

The weight sensors 302-308 are arranged in contact with the platform 202. Each weight sensor 302-308 is connected to a single jack. The weight sensors 302-308 are positioned between the platform 202 and the end of the jack. The weight sensors 302-308 are disc shaped sensors. The weight sensors 302-308 are each arranged in electrical communication with an electronic processor 310. The electronic processor 310 is configured to receive and process signals from the weight sensors 302-308 to determine weight of loads on the platform. FIG. 8 shows a schematic diagram of the electronic processor 310 and the weight sensors 302-308 being electrically coupled to the processor 310 by wires. Alternatively the sensors 302-308 may communicate with the processor 310 using a wireless protocol e.g. Bluetooth or infrared. The electronic processor 310 is also in electronic communication with the motor controller 120.

The electronic processor 310 further comprises a memory unit associated with the processor 310. The memory unit 312 functions as a buffer to store sensor signals or values from the sensor to allow the processor to further process the sensor signals. The memory unit 312 in one example is a flash memory.

The electronic processor 310 is configured to receive the signal from each of the weight sensors 302-308 and the electronic processor configured to process the signal and determine stability of the load on the platform 302. More specifically the electronic processor is configured to determine a centre of gravity of a load on the platform 302 by processing the received signals from the weight sensors 302-308 and determine if the centre of gravity is located within a predefined stability boundary. The electronic processor 310 is configured to calculate the centre of gravity of a load based on measuring the weight of the object at different distances from a datum. The electronic processor 310 is further configured to determine the position of the centre of gravity and compare the position relative to a predefined stability boundary. If the centre of gravity is outside the boundary the processor 310 is configured to provide an alarm signal or activate an alarm device warning about the load instability.

Figure 9:
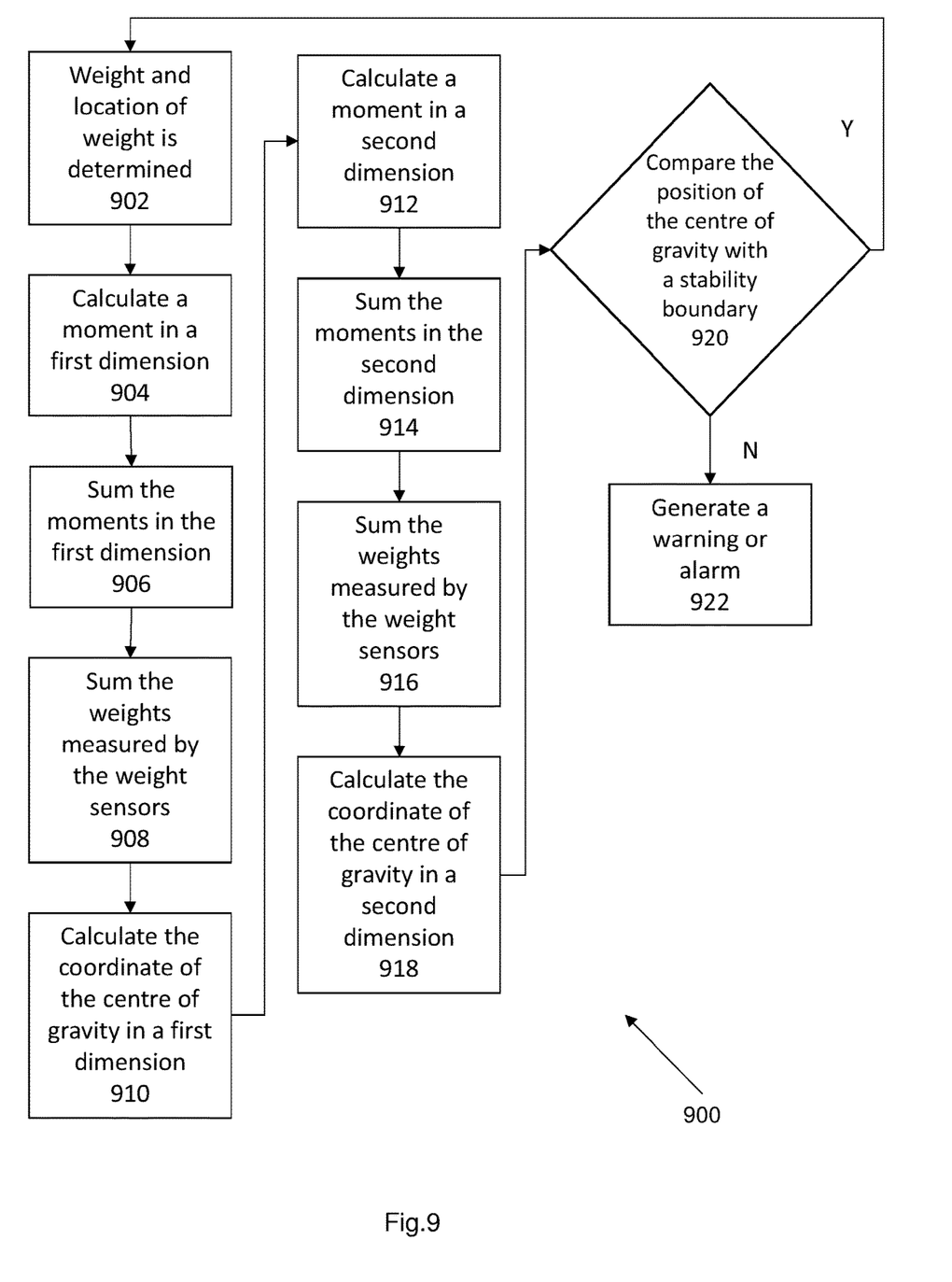
FIG. 9 shows an example method executed by the electronic processor to determine the stability of a load positioned on the platform.
Figure 10:
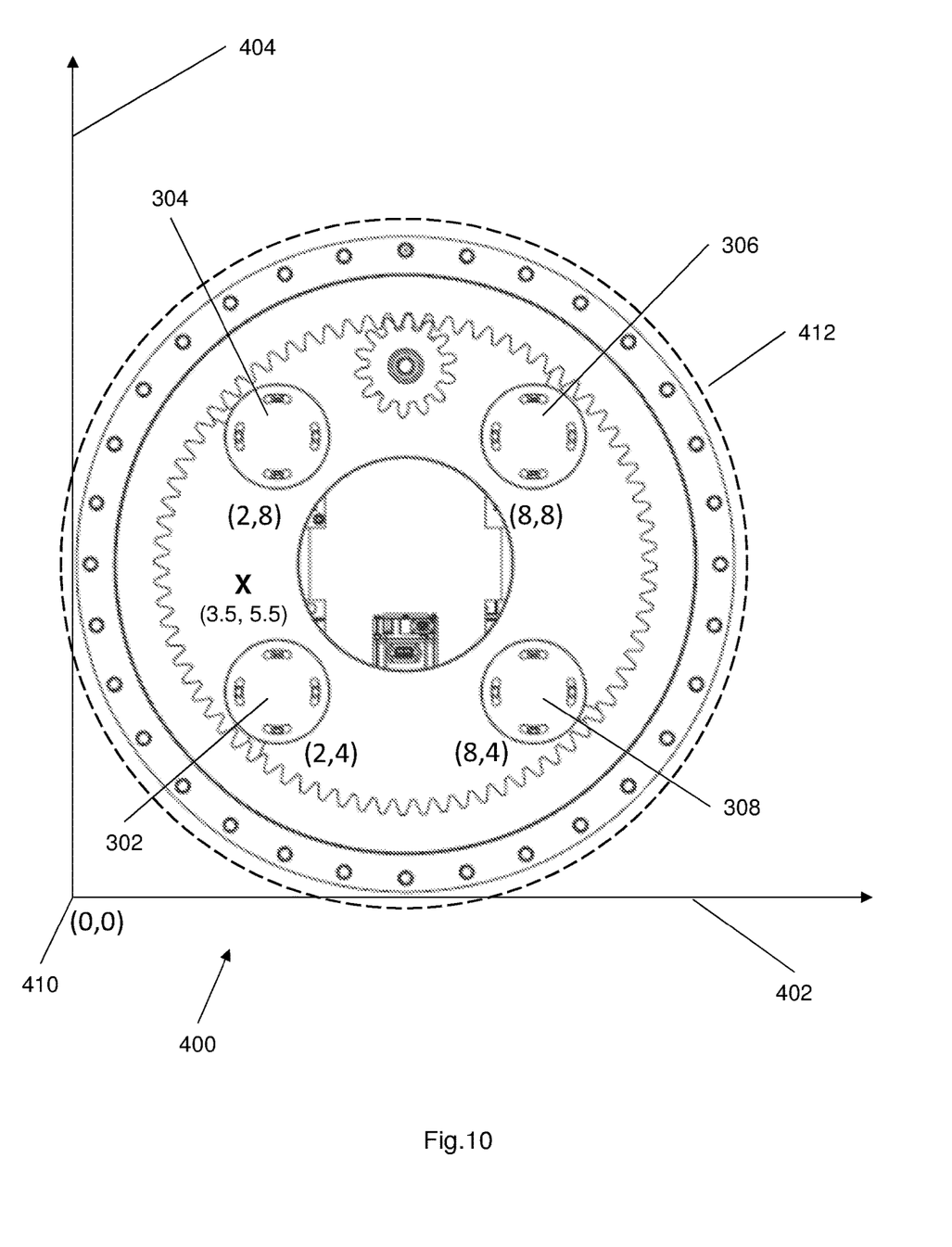
FIG. 10 shows reference coordinate system and an example calculation of a centre of gravity for an irregular shaped load.

One example method to determine stability (i.e. weight distribution) of a load will be described with reference to FIGS. 9 and 10. FIG. 9 shows an example method executed by the electronic processor 310. FIG. 10 shows a reference coordinate system used to determine the centre of gravity of a load.

The electronic processor is configured to measure the weight of the load at the plurality of weight sensors, determine the distance of each weight sensor relative to a predetermined datum and determine the centre of gravity of the load based on the distance of the weight sensor relative to the datum and the weight measured at each weight sensor. The datum and location of each weight sensor is defined within the reference coordinate system. Further the determined centre of gravity is defined as a coordinate in the reference coordinate system.

FIG. 10 shows an example of the reference coordinate system 400. FIG. 10 shows a top view of the platform 302 with the reference coordinate system 400. The reference coordinate system 400 is a two dimensional coordinate system defining a first dimension and a second dimension. In the illustrated example the reference coordinate system 400 is a Cartesian coordinate system and the two dimensions are an x axis 402 and a y axis 404. The reference coordinate system 400 is virtually superimposed on the platform 202, within the processor 310. The processor 310 comprises executable instructions that define the reference coordinate system 400. Positions within the coordinate system may be defined as Cartesian coordinates. Alternatively, the positions within the coordinate system may be defined as polar coordinates.

A datum 410 is defined on the reference coordinate system 400. The datum 410 is a reference point to calculate positions and distances from. The datum 410 is the origin of the coordinate system 400. As shown in FIG. 10 the datum 410 is the origin with a coordinate (0,0). For clarity the weight sensors 302-308 are shown on the platform. Each weight sensor 302-308 has a specific position on the reference coordinate system 400, wherein each position is defined by an x coordinate and a y coordinate.

The electronic processor 310 is configured to determine centre of gravity of a load (i.e. object) on the platform by measuring the weight of the load at a distance from the datum 410.

FIG. 9 shows an example method 900 of determining stability of a load positioned on the platform 302. The method 900 is executed by the electronic processor 310. The method commences at step 902. At step 902 the weight and location of each measured weight is calculated. Step 904 comprises calculating a moment in a first dimension e.g. an x dimension for each weight sensor. The moment is calculated by multiplying the weight by a distance of the weight sensor relative to the datum in the x dimension i.e. multiply the weight by the x coordinate (the x distance from the datum). The processor 310 calculates the moment in the x dimension for each weight sensor. Step 906 comprises summing the moments in the first dimension. Step 908 comprises summing the weights measured by the weight sensors 302-308. Step 910 comprises calculating the coordinate of the centre of gravity in the first dimension (i.e. calculating the x coordinate of the centre of gravity). Step 910 comprises dividing the sum of the moments in the first dimension (i.e. x dimension) by the sum of the weight values to calculate the x coordinate of the centre of gravity. Step 912 comprises calculating a moment in a second dimension (i.e. y axis) for each weight sensor. The moment is calculated by multiplying the weight sensed by each weight sensor by a distance of the weight sensor relative to the datum in a second dimension to calculate the moment. Step 914 comprises summing the moments in the second dimension (i.e. summing the moments in the y dimension). Step 916 comprises summing the weight values measured by the weight sensors. Step 918 comprises calculating the centre of gravity in the second dimension i.e. calculating the y coordinate of the centre of gravity. The y coordinate of the centre of gravity is calculated by dividing the sum of the moments in the second dimension (i.e. in the y dimension) by the sum of the weights. The position of the centre of gravity is defined by the x and y coordinate.

The processor 310 is further configured to compare the position of the centre of gravity relative to a predefined stability boundary. The stability boundary may be a circular boundary or a rectangular boundary or a regular polygon shape. The stability boundary may be stored in the memory device, specifically the coordinates defining the stability boundary may be stored in the memory 312. Step 920 comprises comparing the position of the centre of gravity relative to the stability boundary. If the centre of gravity is beyond (i.e. outside) the stability boundary the method proceeds to step 922. Step 922 comprises alarming to generate a warning about an unstable load. If the centre of gravity is within the boundary then the load can be lifted and transported. The method 900 is repeated at predetermined time intervals. The method 900 is regularly repeated especially when the AGV is moving. The processor 310 may also be configured to repeatedly recalculate the stability boundary as the AGV moves.

Referring to FIG. 10 the electronic processor 310 is configured calculate weight of a load at the locations of each weight sensor. An example calculation of stability of an irregular load will be calculated with reference to FIG. 10. The centre of gravity and position of the centre of gravity relative to a stability boundary will be shown with reference to FIG. 10.

The coordinates of each weight sensor 302-308 are shown on FIG. 10. The electronic processor 310 is further configured to calculate a moment at each location of the weight sensor. The moment in each dimension (i.e. x and y dimensions) are calculated. Referring to FIG. 10 the x moment is calculated by multiplying the x coordinate of the weight sensor with the weight measured by the sensor. An irregular supported by the platform creates the following weight measurements by the weight sensors. For example, the weight sensor measurements are sensor 302=5 g, sensor 304=2 g, sensor 306=4 g, sensor 308=5 g.

The x dimension moments for each weight sensor are sensor 302=10 g.m (i.e. 5 g×2), sensor 304=4 g.m (i.e. 2 g×2), sensor 306=32 g.m (i.e. 4 g×8) and sensor 308=10 g.m (i.e. 5 g×2), with reference to FIG. 10. The sum of the weights is 16 g. The sum of the moments in the x dimension is 56 g.m. The x coordinate for the centre of gravity is calculated by dividing the sum of the moments by the sum of the weights, which in this example is 56/16=3.5. The x distance i.e. x position from the datum 410 is 3.5

The y dimension moments for each weight sensor are sensor 302=20 g.m (5 g×4), sensor 304=16 g.m (i.e. 2 g×8), sensor 306=32 g.m (i.e. 4 g×8) and sensor 308=20 g.m (i.e. 5 g×4). The sum of the weights is 16 g. The sum of the moments in the y dimension are 88 g.m. The y coordinate for the centre of gravity is calculated by dividing the sum of the y moments by the total weight, which in this example is 88/16=5.5. The y distance i.e. y position from the datum is 5.5. Therefore, in the example of FIG. 10 the centre of gravity has a position defined as (3.5, 5.5) relative to the datum. The centre of gravity is illustrated by point X on FIG. 10.

The stability boundary 412 is illustrated in FIG. 10. In the illustrated example the stability boundary 412 is circular. Alternatively the stability boundary may be any regular polygon shape e.g. a rectangle or pentagon etc. As seen in FIG. 10, the centre of gravity of an irregular load is within the stability boundary which indicates the load is stable. The processor 310 would determine this load as stable. If the centre of gravity of the load was outside the stability boundary 412 then the load would have been determined as unstable.

The AGV (specifically the processor 310) determines the centre of gravity in two dimensions the AGV is most likely to tip about the x or y axis. Further two dimensional measurement is sufficient to determine stability and allows for a simpler hardware set up, as compared to determining centre of gravity in three dimensions. The processor may determine centre of gravity in three dimensions, but determining stability in two dimensions reduces computational loads on the processor 310.

The electronic processor is configured to determine the centre of gravity of a load once the load is detected on the platform via the weight sensors, the electronic processor is further configured detect movement of the automated guided vehicle, and the electronic processor is configured to re-determine the centre of gravity of the load as the automated guided vehicle moves. The stability boundary dimensions may be changed based on the speed of the AGV. For example the stability boundary may be reduced in size as the speed increases. The reduction of size may be proportional to the increase in the speed. The reason to reduce the stability boundary is because the loads (e.g. objects) on the platform may move and to improve detection of an imbalance in the load as the AGV is moving. The reduction in the stability boundary is advantageous because it reduces the chances of instability and reduces the margin of error. The electronic processor 310 is further configured to recalculate the stability boundary based on the speed of the automated guided vehicle. The electronic processor 310 is configured to determine speed based on a characteristic of the drive motor. For example the electronic processor may be in electronic communication with the motor controller, as shown in FIG. 8. The processor 310 determines the speed of the motor based on a PWM signal provided to the motor or a current provided to the motor or any other characteristic. Alternatively the AGV may include an accelerometer or a Doppler sensor that is configured to determine the speed of the AGV.

The described AGV is advantageous because it automatically determines the weight distribution of load. Specifically the AGV determines stability of the load. This is advantageous because it reduces the chances of an unstable load being lifted. Determining stability of a load on the platform, prior to lifting the load, improves safety and function of the AGV by preventing lifting of unstable loads and reducing the chances of the load tipping. The AGV is also advantageous because the stability is constantly recalculated even as the AGV moves in order to avoid overloading and tipping over of the AGV. The AGV as disclosed reduces the chances of the lifting mechanism being overloaded based on the weight measurements by the weight sensors. If the weight exceeds a threshold an alarm can be raised on the lifting mechanism may be disabled. Similarly the AGV also determines stability of the load and prevents lifting of loads that may cause the AGV to tip due to the centre of gravity of the load being positioned outside a stability boundary. The AGV is safer and reduces crashes or dropping a load or tipping over due to unstable loads. The described approach to detect load stability is also a simple approach to determine the stability of irregular shaped loads and determine the stability of loads having unknown shapes.

In an embodiment the electronic processor 310 may be implemented as an independent processing module on the AGV. The processor 310 may be implemented as an IC or a chip or an ASIC or a microprocessor. In some alternative configurations the electronic processor 310 may be implemented as in a remote server or a cloud server, wherein the weight sensors are configured to wirelessly transmit weight information to the processor for calculation of the stability of a load.

In an embodiment the electronic processor 310 may include wireless communication capability and functionality. The processor 310 may be wirelessly linked to other devices within a factory environment e.g. a foreman's computer or cell phones of factory workers or an alarm system in the factory. The processor can provide an alarm signal to one or more of these devices if a load on a platform is determined to be unstable.

The datum and the coordinate system as shown in FIG. 10 is arranged such that the platform is in the positive quadrant. In alternative embodiments the processor is configured to superimpose i.e. orient the coordinate system such that the datum is in the middle of the platform. In this configuration x and y coordinates may be positive and negative values. The specific arrangement of the coordinate system can be predetermined. As shown in FIG. 10 the coordinates are Cartesian coordinates. In an alternative configuration all coordinates may be defined as polar coordinates.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An automated guided vehicle comprising:
   a chassis; and
   a load supporting apparatus positioned on the chassis, the load supporting apparatus comprising:
   a platform to support a load,
   a rotation mechanism coupled to the platform and configured to rotate the platform so as to orient the load with respect to the chassis,
   a plurality of weight sensors located in contact with the platform, the plurality of weight sensors configured to provide a signal indicative of a weight of the load on the platform
   a lifting mechanism comprising a plurality of jacks arranged to move in a synchronized manner, the plurality of jacks supports the platform and configured to raise and lower the platform,
   wherein each of the plurality of weight sensors is disposed on a respective one of plurality of jacks of the lifting mechanism, and
   an electronic processor arranged in electronic communication with the plurality of weight sensors, the electronic processor configured to receive the signal from each of the plurality of weight sensors and the electronic processor configured to process the signal and determine stability of the load on the platform and to process the received signal or signals indicative of weight and determine a centre of gravity of the load, wherein the stability is determined based on a centre of gravity of the load on the platform;
   wherein the electronic processor is configured to compare a location of the centre of gravity being determined with a predefined stability boundary in order to determine the stability of the load, the predefined stability boundary is in circular shape or regular polygonal shape;
   wherein the electronic processor is further configured to determine the stability of the load based on the location of the centre of gravity of the load relative to the predefined stability boundary, the load is determined as being stable if the centre of gravity is within the predefined stability boundary and the load is determined as being unstable if the centre of gravity is outside the predefined stability boundary; and
   wherein the electronic processor is further configured to, when the automated guided vehicle moves, repeatedly determine the centre of gravity of the load being lifted and transported by the automated guided vehicle and repeatedly calculate a stability boundary based on a speed of the automated guided vehicle, in order to determine if the load becomes unstable as the centre of gravity of the load and/or a dimension of the stability boundary change as the automated guided vehicle moves, wherein the stability boundary is in circular shape or regular polygonal shape.

2. The automated guided vehicle in accordance with claim 1, wherein the dimension of the stability boundary reduces as the speed of the automated guided vehicle increases.

3. The automated guided vehicle in accordance with claim 2, wherein the reduction of the dimension of the stability boundary is proportional to the increase in the speed of the automated guided vehicle.

4. The automated guided vehicle in accordance with claim 2, wherein, when the automated guided vehicle moves, the load is determined as being stable if the centre of gravity is within the stability boundary and the load is determined as being unstable if the centre of gravity is outside the stability boundary.

5. The automated guided vehicle in accordance with claim 1, wherein the predefined stability boundary represents a limit for a location of the load.

6. The automated guided vehicle in accordance with claim 1, wherein the predefined stability boundary is stored within the electronic processor.

7. The automated guided vehicle in accordance with claim 1, wherein the plurality of weight sensors are positioned to contact the platform such that the platform bears weight on to the plurality of weight sensors and wherein the plurality of weight sensors are spaced apart from each other.

8. The automated guided vehicle in accordance with claim 7, wherein the plurality of weight sensors are evenly spaced apart from each other along the platform and wherein each of the plurality of weight sensors is a load sensor.

9. The automated guided vehicle in accordance with claim 7, wherein the load supporting apparatus comprises four weight sensors.

10. The automated guided vehicle in accordance with claim 1, wherein the electronic processor is configured to determine a location of each of the plurality of weight sensors relative to a datum, the electronic processor is configured to determine the centre of gravity of the load based on the weight sensed at each of the plurality of weight sensors and the location of weight sensed at each of the plurality of weight sensors.

11. The automated guided vehicle in accordance with claim 10, wherein the electronic processor is configured to determine the centre of gravity by calculating a moment for weight sensed at each of the plurality of weight sensors, summing the moments and dividing the sum of the moments by the sum of the weights determined at each of the plurality of weight sensors, wherein the centre of gravity being determined as a location relative to the datum.

12. The automated guided vehicle in accordance with claim 11, wherein the electronic processor is configured to determine moment by multiplying a weight sensed at each of the plurality of weight sensors by a distance of the respective one of the plurality of weight sensors from the datum.

13. The automated guided vehicle in accordance with claim 10, wherein the locations of the plurality of weight sensors, the datum and the centre of gravity being determined are defined on a predefined coordinate system stored within the electronic processor, such that the locations of the plurality of weight sensors, the datum and the boundary are defined as coordinates on the predefined coordinate system.

14. The automated guided vehicle in accordance with claim 13, wherein the location of each of the plurality of weight sensors and the centre of gravity are defined as Cartesian coordinates or polar coordinates relative to the datum, wherein the datum.

15. The automated guided vehicle in accordance with claim 1, wherein the electronic processor is configured to adjust the shape and/or size of the stability boundary based on the motion of the automated guided vehicle.

16. The automated guided vehicle in accordance with claim 15, wherein the electronic processor is configured detect movement of the AGV based on a signal from a drive motor or based on a signal received from a motion sensor positioned on the chassis.

17. An automated guided vehicle comprising:
a chassis,
two or more movement structures connected to the chassis and rotatable relative to the chassis,
a drive assembly disposed on the chassis, the drive assembly comprising a drive motor and a drive shaft, the drive shaft coupled to the drive motor and the two or more movement structures to connect the drive motor to the two or more movement structures, wherein the drive motor is configured to provide a drive force that is transmitted to the two or more movement structures via the drive shaft, the drive force causing the automated guided vehicle to move, and
a load supporting structure a load supporting apparatus positioned on the chassis, the load supporting apparatus comprising:
a platform to support a load,
a rotation mechanism coupled to the platform and configured to rotate the platform so as to orient the load with respect to the chassis,
a lifting mechanism comprising a plurality of jacks that can vertically translate in a synchronized manner, the plurality of jacks arranged in contact with the platform to support the platform and vertically translate the platform,
a plurality of weight sensors located in contact with the platform, the plurality of weight sensors configured to provide a signal indicative of a weight of the load on the platform, and
an electronic processor arranged in electronic communication with the plurality of weight sensors, the electronic processor configured to receive the signal from each of the plurality of weight sensors, wherein the electronic processor is configured to process the received signals to determine a centre of gravity of the load on the platform and determine if the centre of gravity is situated within a predefined stability boundary;
wherein the electronic processor is configured to compare a location of the centre of gravity being determined with a predefined stability boundary in order to determine stability of the load, the predefined stability boundary is in a circular shape or a regular polygonal shape;
wherein the electronic processor is further configured to determine the stability of the load based on the location of the centre of gravity of the load relative to the predefined stability boundary, the load is determined as being stable if the centre of gravity is within the predefined stability boundary and the load is determined as being unstable if the centre of gravity is outside the predefined stability boundary; and
wherein the electronic processor is further configured to, when the automated guided vehicle moves, repeatedly determine the centre of gravity of the load being lifted and transported by the automated guided vehicle and repeatedly calculate a stability boundary based on a speed of the automated guided vehicle, in order to determine if the load becomes unstable as the centre of gravity of the load and/or a dimension of the stability boundary change as the automated guided vehicle moves, wherein the stability boundary is in circular shape or regular polygonal shape.

18. The automated guided vehicle in accordance with claim 17, wherein the electronic processor is configured measure the weight of the load at the plurality of weight sensors, determine a distance of each of the plurality of weight sensors relative to a predetermined datum and determine the centre of gravity of the load based on the distance of each of the plurality of weight sensors relative to the datum and the weight measured at the respective one of the plurality of weight sensors.

19. The automated guided vehicle in accordance with claim 18, wherein the electronic processor comprises a reference coordinate system, the datum and location of each of the plurality of weight sensors is defined within the reference coordinate system.

20. The automated guided vehicle in accordance with claim 19, wherein the centre of gravity being determined is defined as a coordinate in the reference coordinate system.

21. The automated guided vehicle in accordance with claim 18, wherein the reference coordinate system is a two dimensional coordinate system defining a first dimension and a second dimension, wherein the datum is the origin of the reference coordinate system and wherein the centre of gravity and location of each of the plurality of weight sensors are defined either as Cartesian coordinates or polar coordinates.

22. The automated guided vehicle in accordance with claim 21, wherein the electronic processor is configured to:
i) multiply the weight sensed by each of the plurality of weight sensors by a distance of the respective one of the plurality of weight sensors relative to the datum in a first dimension to calculate a moment in a first dimension,
ii) sum the moment in the first dimension,
iii) sum the weight values,
iv) divide the sum of moments in the first dimension by the sum of the weight values to calculate a coordinate of the centre of gravity in the first dimension
v) multiply the weight sensed by each of the plurality of weight sensors by a distance of the respective one of the plurality of weight sensors relative to the datum in a second dimension to calculate a moment in a second dimension,
vi) sum the moments in the second dimension,
vii) sum the weight values,
viii) divide the sum of moments in the second dimension by the sum of the weight values to calculate a coordinate of the centre of gravity in the second dimension, wherein a position of the centre of gravity is defined as a coordinate within the reference coordinate system.

23. The automated guided vehicle in accordance with claim 22, wherein the electronic processor is configured to generate an alarm signal and provide the alarm signal to another device if the load is determined to be unstable.

24. The automated guided vehicle in accordance with claim 23, wherein the electronic processor is configured to determine the centre of gravity of a load once the load is detected on the platform via the plurality of weight sensors, the electronic processor is further configured detect movement of the automated guided vehicle.

25. The automated guided vehicle in accordance with claim 24, wherein the electronic processor is configured to determine speed based on a characteristic of the drive motor.

26. The automated guided vehicle in accordance with claim 25, wherein the dimension of the stability boundary reduces as the speed of the automated guided vehicle increases.

27. The automated guided vehicle in accordance with claim 26, wherein the reduction of the dimension of the stability boundary is proportional to the increase in the speed of the automated guided vehicle.

28. The automated guided vehicle in accordance with claim 25, wherein, when the automated guided vehicle moves, the load is determined as being stable if the centre of gravity is within the stability boundary and the load is determined as being unstable if the centre of gravity is outside the stability boundary.

* * * * *